(12) United States Patent
Mamidi et al.

(10) Patent No.: US 10,762,050 B2
(45) Date of Patent: Sep. 1, 2020

(54) DISTRIBUTION OF GLOBAL NAMESPACE TO ACHIEVE PERFORMANCE AND CAPACITY LINEAR SCALING IN CLUSTER FILESYSTEMS

(71) Applicant: EMC IP Holding Company LLC, Hopkinton, MA (US)

(72) Inventors: Murthy V. Mamidi, San Jose, CA (US); Abhishek Rajimwale, San Jose, CA (US); George Mathew, Belmont, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 16/262,744

(22) Filed: Jan. 30, 2019

(65) Prior Publication Data

US 2020/0242086 A1 Jul. 30, 2020

(51) Int. Cl.
*G06F 16/00* (2019.01)
*G06F 16/174* (2019.01)
*G06F 16/188* (2019.01)
*G06F 16/22* (2019.01)

(52) U.S. Cl.
CPC ........ *G06F 16/1748* (2019.01); *G06F 16/188* (2019.01); *G06F 16/2246* (2019.01)

(58) Field of Classification Search
CPC .................................................. G06F 16/2246
See application file for complete search history.

(56) References Cited

U.S. PATENT DOCUMENTS

2006/0053157 A1\* 3/2006 Pitts ...................... G06F 16/148
2017/0011055 A1\* 1/2017 Pitts ...................... G06F 16/156

\* cited by examiner

*Primary Examiner* — Ajith Jacob
(74) *Attorney, Agent, or Firm* — Chamberlain, Hrdlicka, White, Williams & Aughtry

(57) ABSTRACT

The distribution of global namespace to achieve performance and capacity linear scaling in cluster filesystems. Specifically, the disclosure entails the distribution of files, tracked in namespace trees, among various cluster nodes while linking the namespace trees through a centralized access point, thus providing a global namespace abstraction for the distributed cluster.

20 Claims, 12 Drawing Sheets

DISTRIBUTION OF GLOBAL NAMESPACE TO ACHIEVE PERFORMANCE AND CAPACITY LINEAR SCALING IN CLUSTER FILESYSTEMS

BACKGROUND

In a cluster file system, linear performance scaling is difficult to achieve especially when files are distributed unevenly across the cluster. This unevenness presents synchronization and crash resilience issues.

DETAILED DESCRIPTION

Specific embodiments of the invention will now be described in detail with reference to the accompanying figures. In the following detailed description of the embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to necessarily imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout the application, the phrase 'operatively connected' may be used to describe a connection between components. As used hereinafter, the aforementioned phrase may refer to any direct (e.g., wired directly between two or more components) or indirect (e.g., wired and/or wireless connections between any number of components connection the operatively connected components) connection.

In general, embodiments of the invention relate to the distribution of global namespace to achieve performance and capacity linear scaling in cluster filesystems. Specifically, one or more embodiments of the invention entail the distribution of files, tracked in namespace trees, among various cluster nodes while linking the namespace trees through a centralized access point, thus providing a global namespace abstraction for the distributed cluster.

Figure 1:
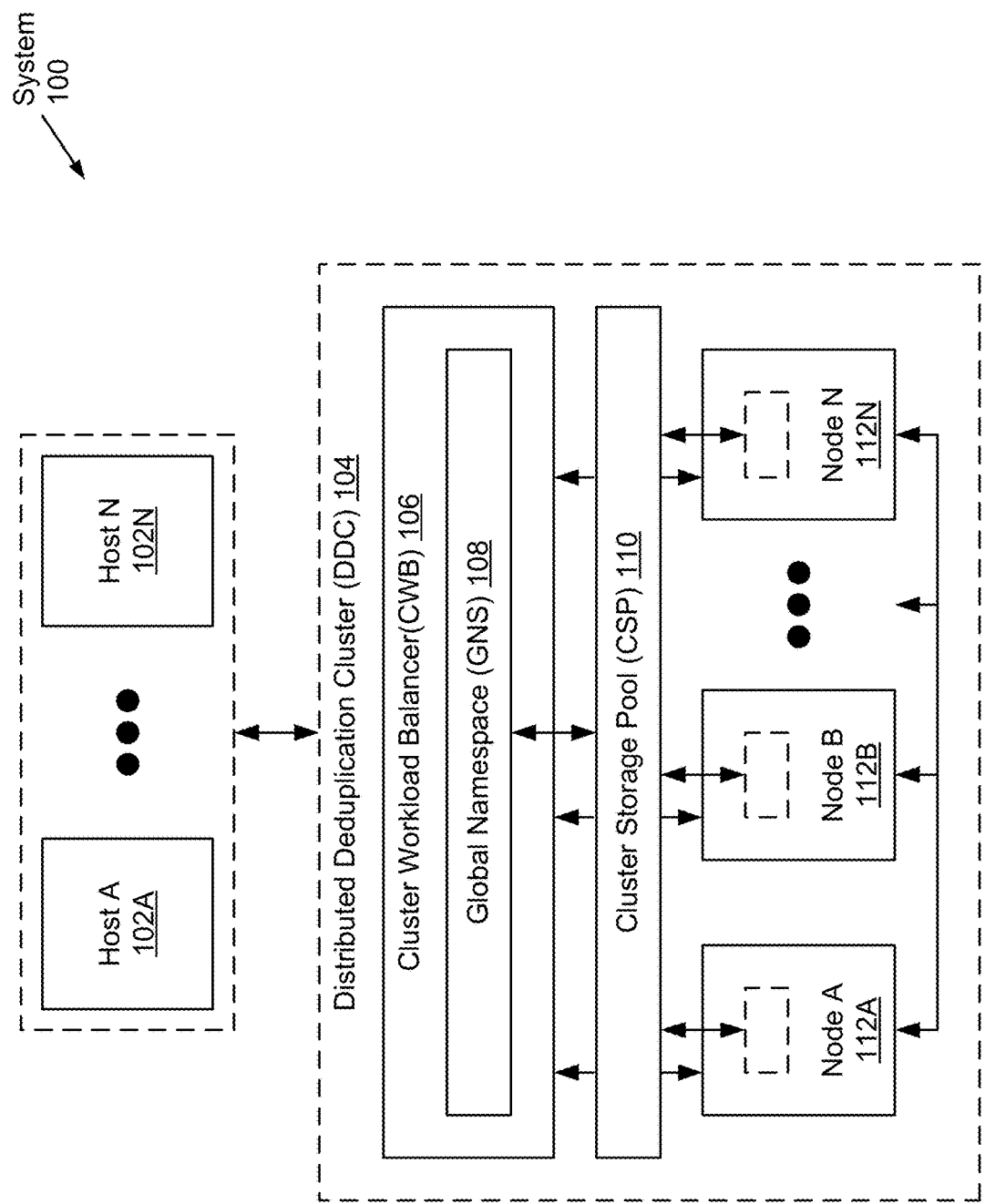
FIG. 1 shows a system in accordance with one or more embodiments of the invention.

FIG. 1 shows a system in accordance with one or more embodiments of the invention. The system (100) may include one or more hosts (102A-102N), which may be operatively connected to a distributed deduplication cluster (DDC) (104). Each of these system (100) components is described below.

In one embodiment of the invention, the above-mentioned components may be directly or indirectly connected to one another through a network (not shown) (e.g., a local area network (LAN), a wide area network (WAN) such as the Internet, a mobile network, etc.). The network may be implemented using any combination of wired and/or wireless connections. In embodiments in which the above-mentioned components are indirectly connected, there may be other networking components or systems (e.g., switches, routers, gateways, etc.) that may facilitate communications. Further, the above-mentioned components may interact with one another using any combination of wired and/or wireless communication protocols.

In one embodiment of the invention, a host (102A-102N) may represent a physical computing system that submits service requests to the DDC (104). To that extent, a host (102A-102N) may include, but is not limited to, the following functionalities: issuing file operation requests to the DDC (104); and receiving file operation responses from the DDC (104) in response to issued file operation requests. One of ordinary skill will appreciate that a host (102A-102N) may perform other functionalities without departing from the scope of the invention. Examples of a host (102A-102N) may include, but are not limited to, a desktop computer, a laptop computer, a tablet computer, a server, a mainframe, a smartphone, or any other computing system similar to the exemplary computing system shown in FIG. 6.

In one embodiment of the invention, the DDC (104) may represent a group of linked nodes—e.g., nodes (112A-112N) (described below)—which may be configured to share resources. The shared resources may include, but are not limited to, any subset or all of the following: compute resources (e.g., computer processors and memory), storage resources (e.g., persistent data storage), and network resources (e.g., traffic bandwidth). Further, the sharing of any resource may entail virtualizing the resource in each node (112A-112N) to create a logical pool of that resource that spans, and is made available to all nodes (112A-112N), across the DDC (104). For example, when considering storage resources, the physical device(s) (e.g., hard disk drives, solid state drives, etc.) representative of the local storage resources on each node (112A-112N) may be virtualized to form a globally-accessible cluster storage pool (CPS) (110). Accordingly, the CPS (110) may represent a logical pool of disk capacity formed from all storage resources across the DDC (104).

In one embodiment of the invention, a node (112A-112N) may represent a physical computing system dedicated to processing workloads—e.g., service requests—submitted to the DDC (104). To that extent, a node (112A-112N) may include, but is not limited to, the following functionalities: receiving file operation requests delegated thereto from the cluster workload balancer (CWB) (106) (described below); processing the file operation requests in accordance with embodiments of the invention (see e.g., FIGS. 5A-5E); and returning file operation responses back to the CWB (106) based on results obtained from processing the file operation requests. One of ordinary skill will appreciate that a node (112A-112N) may perform other functionalities without departing from the scope of the invention. Further, a node (112A-112N) may be implemented using a server, or any other computing system similar to the exemplary computing system shown in FIG. 6. Nodes (112A-112N) are described in further detail below with respect to FIG. 2.

In one embodiment of the invention, the DDC (104) may further include a cluster workload balancer (CWB) (106). The CWB (106) may represent a physical computing system dedicated to distributing service traffic across the various nodes (112A-112N) of the DDC (104). This distribution of service traffic (also referred as load balancing) may reduce individual node (112A-112N) workload, may prevent any one node (112A-112N) from becoming a single point of failure, and may improve the responsiveness and availability of the deduplicated storage service provided by the DDC (104). To the extent of load balancing, the CWB (106) may include, but is not limited to, the following functionalities: monitoring and tracking resource availability, for any given point in time, across the various nodes (112A-112N) in the DDC (104); receiving file operation requests from the host(s) (102A-102N); selecting best available nodes (112A-112N) to process the file operation requests based on the tracked resource availability; delegating the file operation requests to the best available nodes for processing; receiving file operation responses from the best available nodes; and forwarding the file operation responses to the requesting host(s) (102A-102N).

In one embodiment of the invention, the CWB (106) may also represent a single point of contact, for the DDC (104), with which the host(s) (102A-102N) may interface. To that extent, the CWB (106) may implement a global namespace (GNS) (108) thereon. The GNS (108) may refer to an abstraction that unifies the various local filesystems, maintained by the various nodes (112A-112N) across the DDC (104), into a single virtualized global filesystem. The single virtualized global filesystem may subsequently be presented to the host(s) (102A-102N) in order to simplify the management and accessibility of storage and/or data across the DDC (104), which may be aggregated in the form of the CPS (110). Examples of the CWB (106) may include, but is not limited to, a desktop computer, a server, a mainframe, or any other computing system similar to the exemplary computing system shown in FIG. 6.

While FIG. 1 shows a configuration of components, other system (100) configurations may be used without departing from the scope of the invention.

Figure 2:
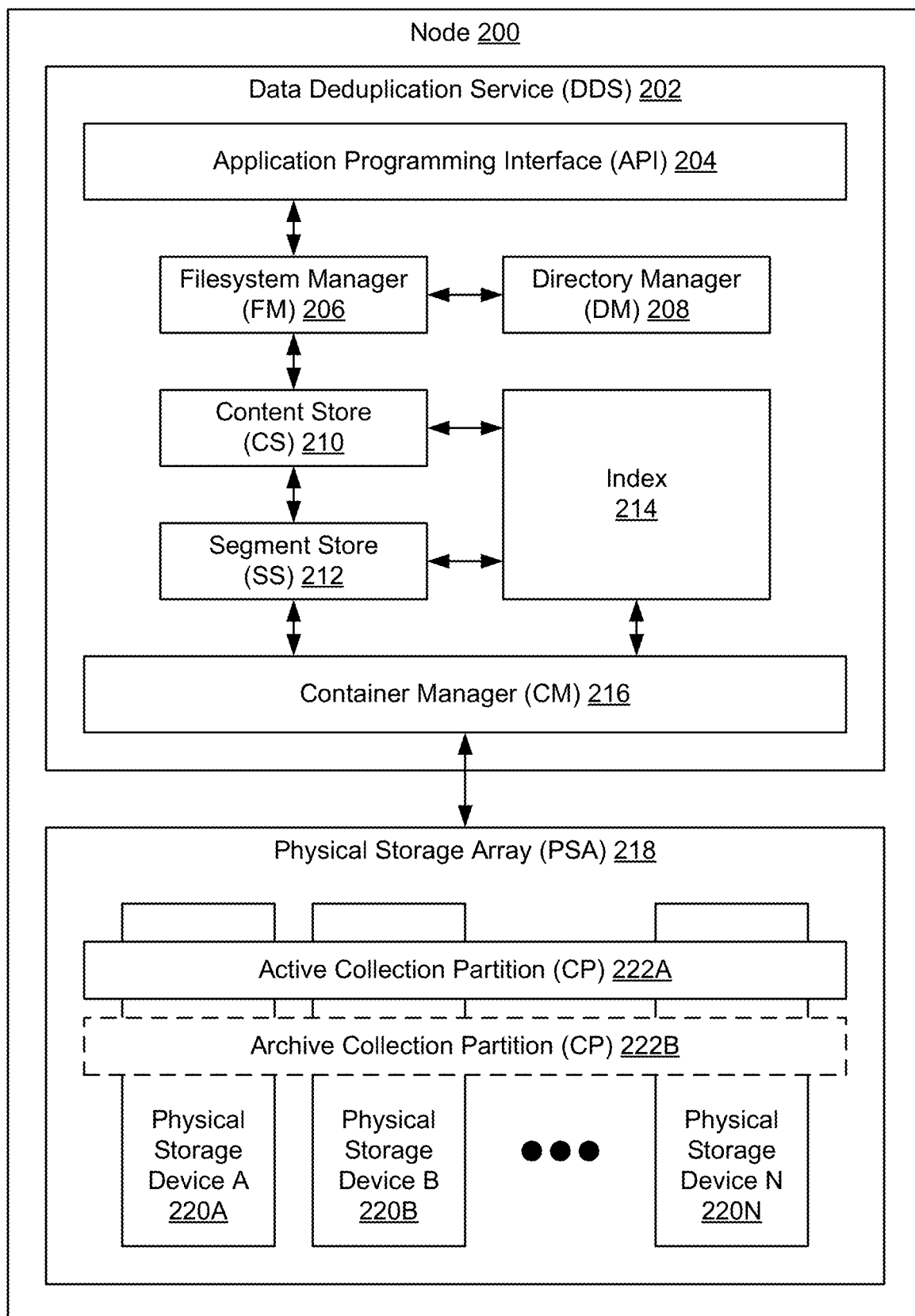
FIG. 2 shows a node in accordance with one or more embodiments of the invention.

FIG. 2 shows a node in accordance with one or more embodiments of the invention. A node (200) may include a data deduplication service (DDS) (202) operatively connected to a physical storage array (PSA) (218). Each of these node (200) components is described below.

In one embodiment of the invention, the DDS (202) may represent hardware logic (e.g., one or more computer processors), software logic (e.g., one or more computer programs), or a combination thereof, which may be responsible for consolidating and/or retrieving data—e.g., files—in/from the PSA (218). The DDS (202) may fulfill the aforementioned responsibility while performing data deduplication. Data deduplication may refer to a data compression technique directed to eliminating duplicate (or redundant) blocks or chunks of data, thereby reducing storage overhead. Further, to facilitate the consolidation, tracking, and retrieval of data on the node (200) and/or across the distributed deduplication cluster (DDC) (not shown) (see e.g., FIG. 1), the DDS (202) may include an application programming interface (API) (204), a filesystem manager (FM) (206), a directory manager (DM) (208), a content store (CS) (210), a segment store (SS) (212), an index (214), and a container manager (CM) (216). Each of these DDS (202) subcomponents is described below.

In one embodiment of the invention, the API (204) may represent an interface, implemented using hardware, software, or any combination thereof, through which external entities—e.g., the cluster workload balancer (CWB) (not shown) (see e.g., FIG. 1) and other nodes (200) in the DDC—may interact with the DDS (202). Subsequently, the API (204) may employ a set of subroutine definitions, protocols, and/or tools directed to enabling communications between the DDS (202) and the aforementioned external entities. Further, the API (204) may include, but is not limited to, the following functionalities: receiving file operation requests delegated from the CWB; extracting file operations and operation-pertinent arguments (OPA) from the file operation requests; invoking the FM (206) using the file operations and the OPA, to process the file operation requests; receive remote procedure calls (RPC) from the FM (206) for transmission to one or more specified other nodes (200); receive remote procedure reports (RPR) from other node(s) (200) in response to RPC transmitted beforehand; invoking the FM (206) using the RPR; receiving file operation responses from the FM (206); and transmitting the file operation responses, disclosing results (if any) concerning earlier delegated file operation requests, to the CWB. One of ordinary skill will appreciate that the API (204) may perform other functionalities without departing from the scope of the invention.

In one embodiment of the invention, the FM (206) may represent a computer program responsible for the coordination of DDS (202) operations. To that extent, the FM (206) may include functionality to: receive file operations delegated to the node (200) for processing; invoke other DDS (202) subcomponents (e.g., the DM (208) and the CS (210)) towards processing received file operations; issue remote procedure calls (RPC) to other (remote) nodes; and issue file operation reports based on results yielded from processing received file operations. Further, the FM (206) may include functionality to maintain, lookup, and update a local redirection cache (not shown) (see e.g., FIG. 4). In one embodiment of the invention, the FM (206) may include functionality to indicate which file segments (i.e., unique blocks or chunks of data) pertain to a file. These file segments may be identified as a list of fingerprints (or hashes) representative of the file segments.

In one embodiment of the invention, the DM (208) may represent a computer program responsible for the management of files in one or more filesystems across the DDC (not shown). To that extent, the DM (208) may include functionality to maintain, traverse, and update one or more namespace trees (see e.g., FIG. 3A). A namespace tree may represent a hierarchical data structure directed to reflecting the way files and/or directories may be identified and stored in data storage (i.e., the PSA (218)). Specifically, the DM (208) may maintain a meta-namespace tree and one or more shadow-namespace trees (not shown). The meta-namespace tree may represent the filesystem structure for a set of files associated with a collection partition (CP) (222A, 222B) (described below) of the node (200). The file segments pertinent to each file, of the aforementioned set of files, may either be consolidated on the PSA (218) (i.e., mapped via a child namespace record (described below) in the meta-namespace tree) or on the PSA of a remote node (not shown) (i.e., mapped via a child indirect namespace record (described below) in the meta-namespace tree). On the other hand, each shadow-namespace tree may represent the filesystem structure for another set of files associated with a respective CP on a remote node. That is, the DM (208) may manage a shadow-namespace tree for each remote node, which along with the node (200), forms the cluster of nodes in the DDC. Moreover, for each shadow-namespace tree, the file segments pertinent to each file tracked therein may be consolidated on the PSA (218) (i.e., mapped via a corresponding child namespace record in the respective shadow-namespace tree).

In one embodiment of the invention, the CS (210) may represent may represent a computer program responsible for the management of file content associated with various files consolidated in the PSA (218). To that extent, the CS (210) may include functionality to maintain, traverse, and update various segment trees. A segment tree may refer to a Merkel tree, or a hierarchical data structure, for identifying and tracking the locations of file segments, pertinent to a single file, stored in the physical storage device(s) (220A-220N) of the PSA (218). If the PSA (218) is formed from one physical storage device (220A-220N), the locations of the pertinent file segments may be indicated through disk offsets. Alternatively, if the PSA (218) is formed from multiple physical storage devices (220A-220N), the locations of the pertinent file segments may be indicated through physical storage device (220A-220N) identifiers in addition to disk offsets. Furthermore, the CS (210) may also include functionality to, at least in part, execute data deduplication on the node (200) by deconstructing files into file segments (also referred to as blocks or chunks).

In one embodiment of the invention, the SS (212) may represent a computer program responsible for assessing whether new file segments, yielded from the CS (210), may already be stored. Should new file segments be stored already, metadata for those new file segments, rather than the new file segments themselves, may be stored to optimize storage space utilization. In conjunction with the CS (210), the SS (212) may include functionality to execute data deduplication on the node (200).

In one embodiment of the invention, the index (214) may represent a data structure that may be used to locate stored file segments within one or more physical storage devices (220A-220N) of the node (200). More specifically, the index (214) may include associations that map fingerprints (or hashes) to storage locations that consolidate the file segments that which the fingerprints represent.

In one embodiment of the invention, the CM (216) may represent a computer program responsible for the management and tracking of containers. A container may refer to a logical grouping of compression regions consolidated in data storage—e.g., the PSA (218). Each compression region, in turn, may encompass a compressed and/or archived data object that stores one or more file segments and their associated metadata within.

Returning to the node (200) components, in one embodiment of the invention, the PSA (218) may represent a collection of one or more physical storage devices (220A-220B) on which various forms of information—e.g., files—may be consolidated. In turn, each physical storage device (220A-220N) may encompass non-transitory computer readable storage media (e.g., optical disk(s), tape(s), magnetic disk(s), etc.) on which the various forms of information may be stored in whole or in part, and temporarily or permanently. Examples of a physical storage device (220A-220N) may include, but are not limited to, a hard disk drive (HDD), a solid state drive (SSD), and network attached storage (NAS). Further, in one embodiment of the invention, the PSA (218) may be implemented using persistent (i.e., non-volatile) storage. Examples of persistent storage may include, but are not limited to, optical storage, magnetic storage, NAND Flash Memory, NOR Flash Memory, Magnetic Random Access Memory (M-RAM), Spin Torque Magnetic RAM (ST-MRAM), Phase Change Memory (PCM), or any other storage defined as non-volatile Storage Class Memory (SCM).

In one embodiment of the invention, an active collection partition (CP) (222A) may be implemented and span across at least a subset of the physical storage device(s) (220A-220N) of the PSA (218). Generally, a CP—e.g., the active CP (222A)—may represent a deduplication domain. A deduplication domain may refer to a group of files that dedupe together. Accordingly, the active CP (222A) may represent a logical storage pool wherein a collection of files stored therein dedupes only with other files in the logical storage pool. In one embodiment of the invention, an archive CP (222B) may also be implemented and span across at least another subset of the physical storage device(s) (220A-220N) of the PSA (218). In contrast to the active CP (222A), which may store frequently accessed and/or recently created files, the archive CP (222B) may represent a logical storage pool wherein aged, seldom accessed files may reside and dedupe with other aged, seldom accessed files.

Figure 3A:
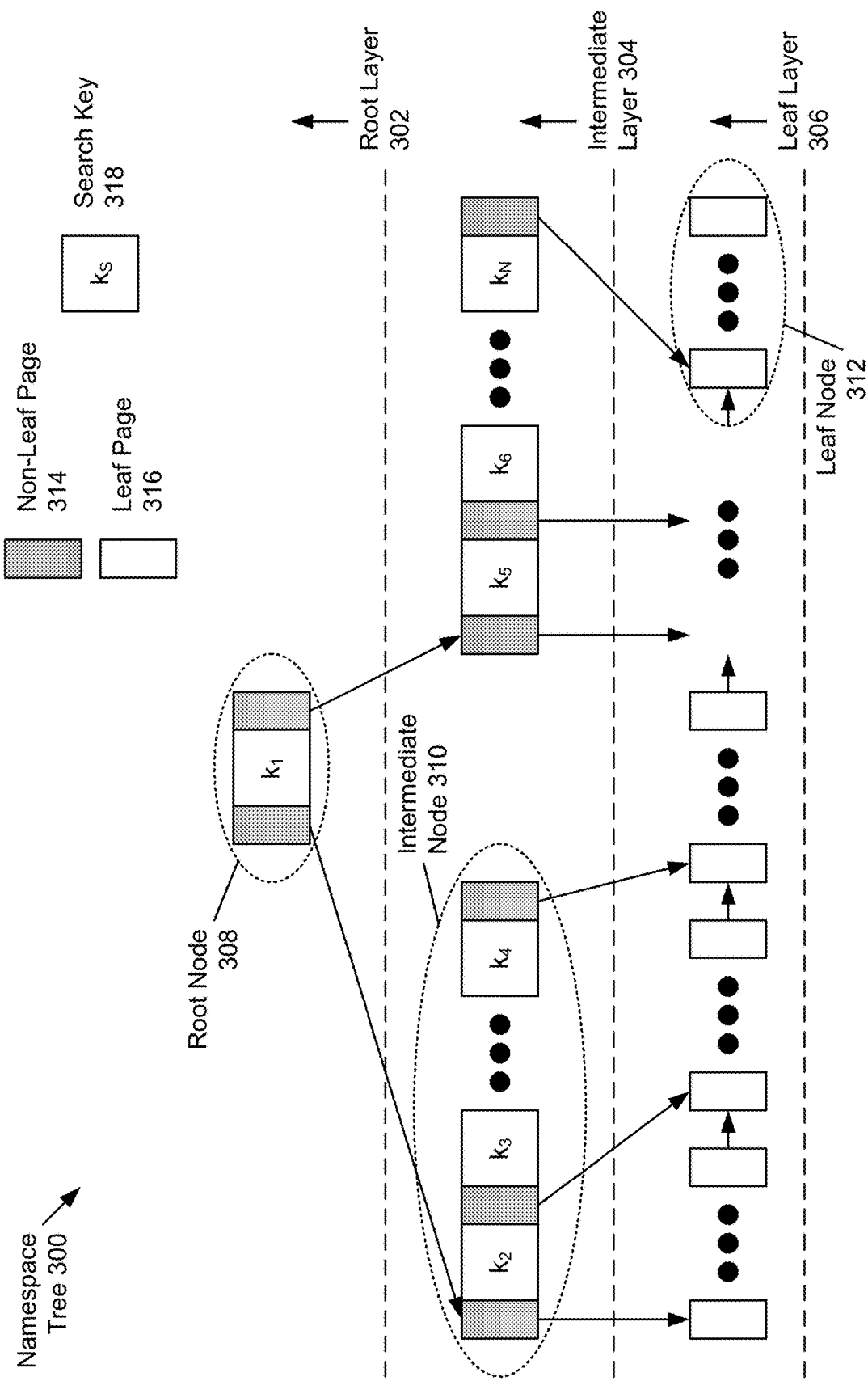
FIG. 3A shows a namespace tree in accordance with one or more embodiments of the invention.

FIG. 3A shows a namespace tree in accordance with one or more embodiments of the invention. The namespace tree (300) may represent a hierarchical data structure for implementing a filesystem namespace. That is, the namespace tree (300) may represent a hierarchical data structure dedicated to indexing and tracking files consolidated across one or more physical storage devices—e.g., within a collection partition (CP) (see e.g., FIG. 2) on a node, or multiple CPs across a cluster of nodes. Further, the namespace tree (300) may resemble a B+ tree.

In one embodiment of the invention, the namespace tree (300) may include a root layer (302), zero or more intermediate layers (304), and a leaf layer (306). The root layer (302), the intermediate layer(s) (304) (if any), and the leaf layer (306) may include a root node (308), one or more intermediate nodes (310), and one or more leaf nodes (312), respectively. The root node (308) and each intermediate node (310) (if any) may encompass a set of at least two or more non-leaf pages (314) and one or more search keys (318), which may be concatenated together in alternating order. Each leaf node (312), on the other hand, may encompass a set of one or more leaf pages (316). Each non-leaf page (314) may substantively represent a pointer that maps to another non-leaf page (314) on a lower level (e.g., an intermediate layer (304)) or a leaf-page (316) on the leaf layer (306). Further, no two non-leaf pages (314) point to the same lower level non-leaf page (314) or leaf page (316). Each search key (318) may represent a router value—e.g., a filename—which may be used to guide the traversal of the namespace tree (300). Moreover, each leaf page (316) may be representative of one or more pointers that lead to metadata describing a given file, which may or may not include a reference to the block map of file data segments (FDS) for the given file. Leaf pages (316) are described in further detail below with respect to FIG. 3B.

Figure 3B:
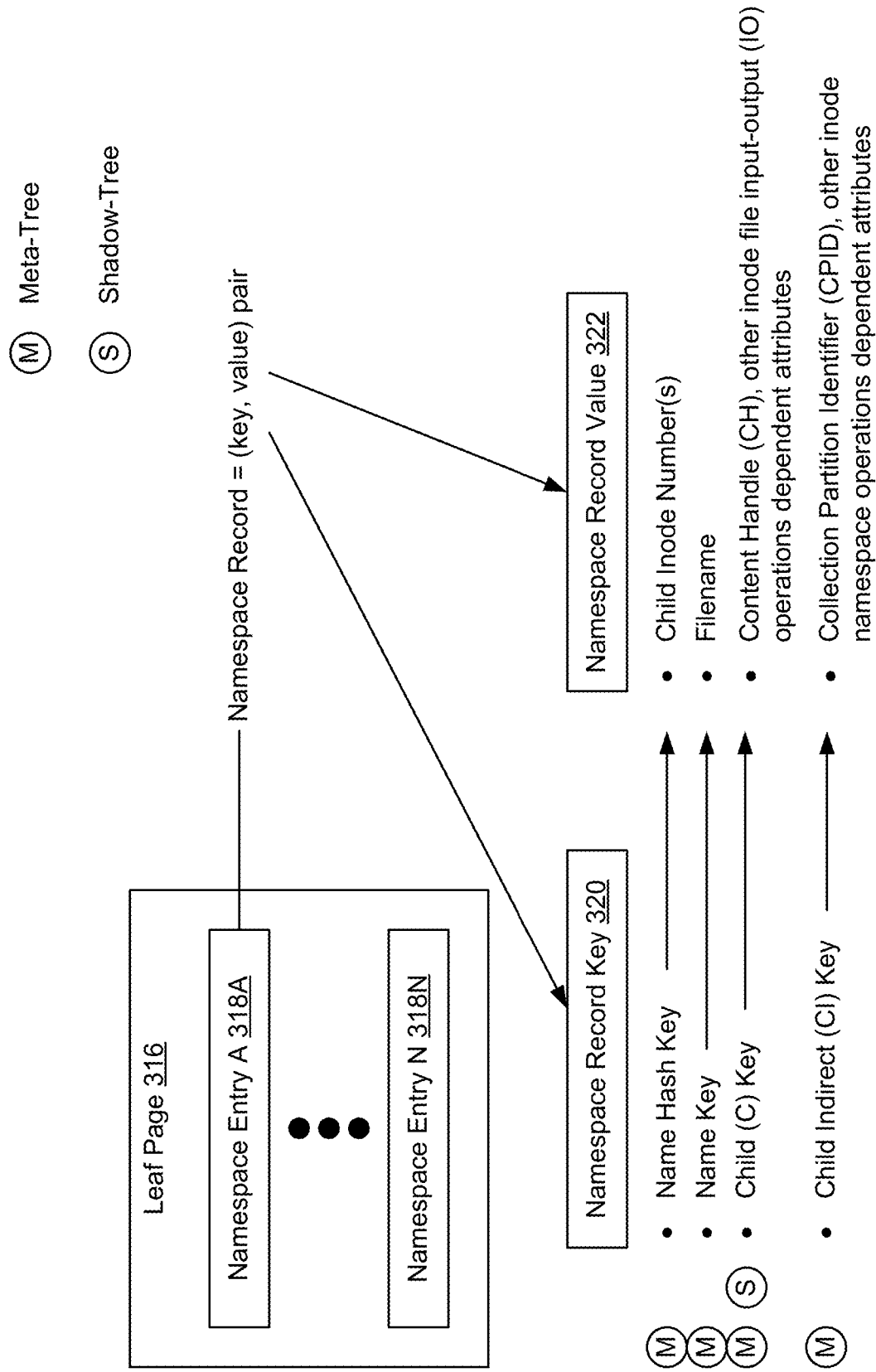
FIG. 3B shows a leaf page in accordance with one or more embodiments of the invention.

FIG. 3B shows a leaf page in accordance with one or more embodiments of the invention. A leaf page (316) may represent a collection of one or more namespace entries (318A-318N), which pertain to a given file. Each namespace entry (318A-318N) (also referred to as a namespace record) may entail a key-value pair of information. The key portion of a namespace entry (318A-318N) may be referred to as the namespace record key (320), whereas the value portion of the namespace entry (318A-318N) may be referred to as the namespace record value (322).

By way of an example, a name hash namespace record may be included as one of the namespace entries (or records) (318A-318N) specified in the leaf page (316) for a given file. The name hash namespace record may refer to a key-value pair that maps a name hash key (e.g., a hash of the filename of the given file) to one or more child inode numbers (e.g., unique identifier(s) for child inodes associated with the given file). By way of another example, a name namespace record may be specified in the leaf page (316) for a given file. The name namespace record may refer to a key-value pair that maps a name key (e.g., a child inode associated with the given file) to the filename of the given file. By way of yet another example, a child namespace record may be specified in the leaf page (316) for a given file. The child namespace record may refer to a key-value pair that maps a child key (e.g., a child inode associated with the given file) to at least a content handle (CH) (e.g., a reference to the block map or segment tree of file data segments (FDS) for the given file). By way of another example still, a child indirect namespace record may be specified in the leaf page (316) for a given file. The child indirect namespace record may refer to a key-value pair that maps a child indirect key (e.g., a child inode associated with the given file) to at least a collection partition identifier (CPID) (e.g., a unique identifier for a collection partition (CP) residing on a remote node—i.e., a node whereon the child indirect namespace record does not reside).

Furthermore, as mentioned above, in one embodiment of the invention, two types of namespace trees may be maintained on any given node by the directory manager (DM) residing thereon. That is, the DM may maintain a meta-namespace tree (for files pertinent to a local node or the node with which the DM is associated) and one or more shadow-namespace trees (for files pertinent to one or more remote nodes, respectively, with which the DM is not associated). Any given leaf page (316) of the meta-namespace tree may list any subset or all of the following namespace record types: (a) the name hash namespace record; (b) the name namespace record; (c) the child namespace record (if the file segments for the given file are stored on the local node); and/or (d) the child indirect namespace record (if the file segments for the given file are stored on a remote node). On the other hand, any given leaf page (316) of a shadow-namespace tree may list any subset or all of the following namespace record types: (a) the name hash namespace record; (b) the name namespace record; and/or (c) the child namespace record. Therefore, all shadow-namespace trees only track file segments for a given file, pertinent to a remote node, that are actually stored on the local node.

Figure 3C:
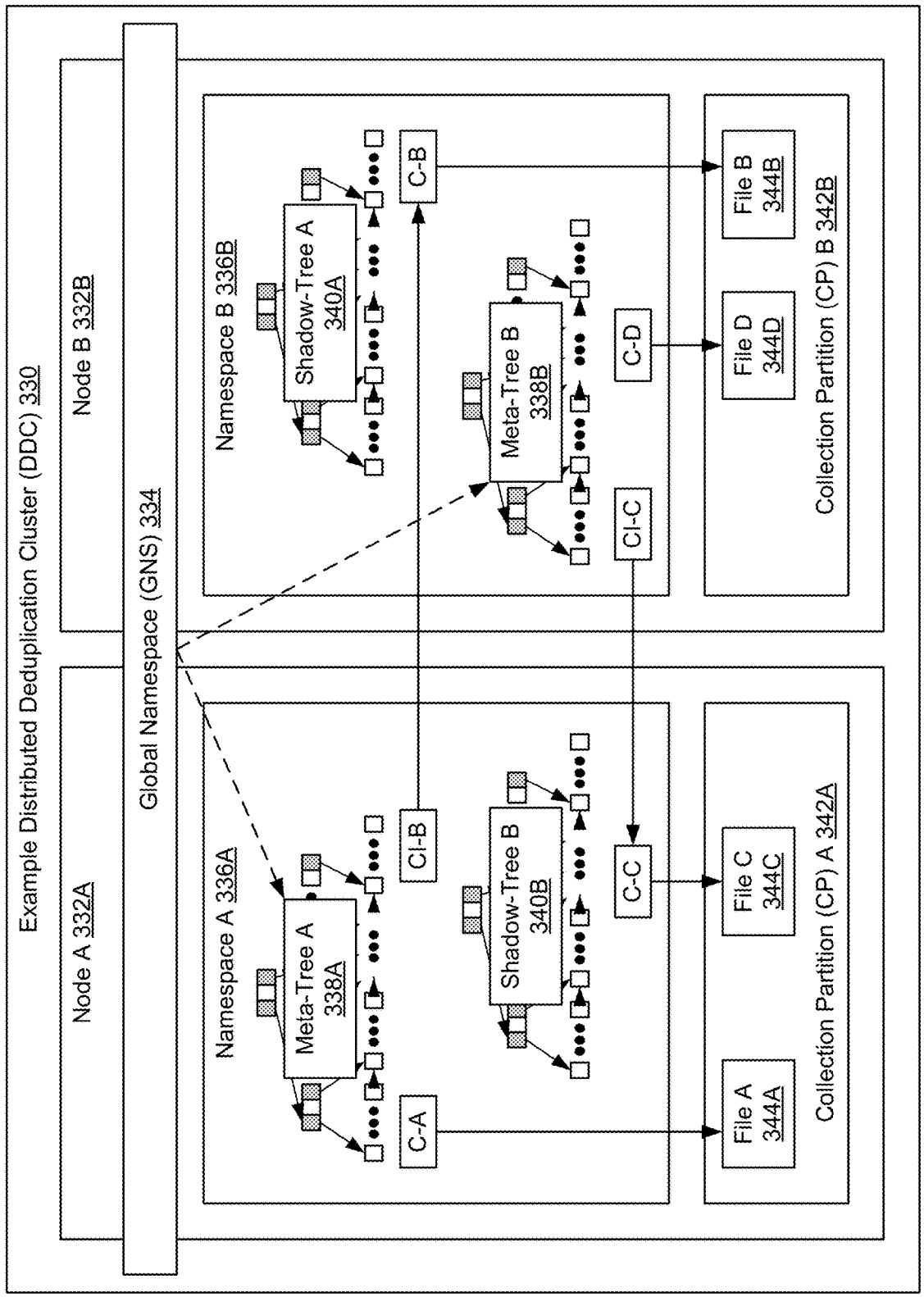
FIG. 3C shows an example distributed deduplication cluster in accordance with one or more embodiments of the invention.

FIG. 3C shows an example distributed deduplication cluster (DDC) in accordance with one or more embodiments of the invention. The example DDC (330) includes two nodes—i.e., a first node (332A) and a second node (332B). Both nodes (332A, 332B) include a respective namespace (336A, 336B) and a respective collection partition (CP) (342A, 342B). In the namespace (336A) of the first node (332A), a first meta-namespace tree (338A) is hosted, as well as a second shadow-namespace tree (340B). On the other hand, in the namespace (336B) of the second node (332B), a second meta-namespace tree (338B) is hosted, as well as a first shadow-namespace tree (340A).

Each meta-namespace tree (338A, 338B) includes leaf pages (not shown) that disclose either a child namespace record or a child indirect namespace record. In contrast, each shadow-namespace tree (340A, 340B) includes leaf pages (not shown) that disclose only a child namespace record. Child namespace records include content handles (CH) (see e.g., FIG. 3B) for files consolidated on the node wherein the namespace tree, including the child namespace records, resides. Meanwhile, child indirect namespace records include collection partition identifiers (CPID), which identify a remote CP (342A, 342B) whereon the CH resides. Further, the global namespace (334) aggregates and unifies the various meta-namespace trees—e.g., the first and second meta-namespace trees (338A, 338B)—to present a single virtualized filesystem.

Figure 4:
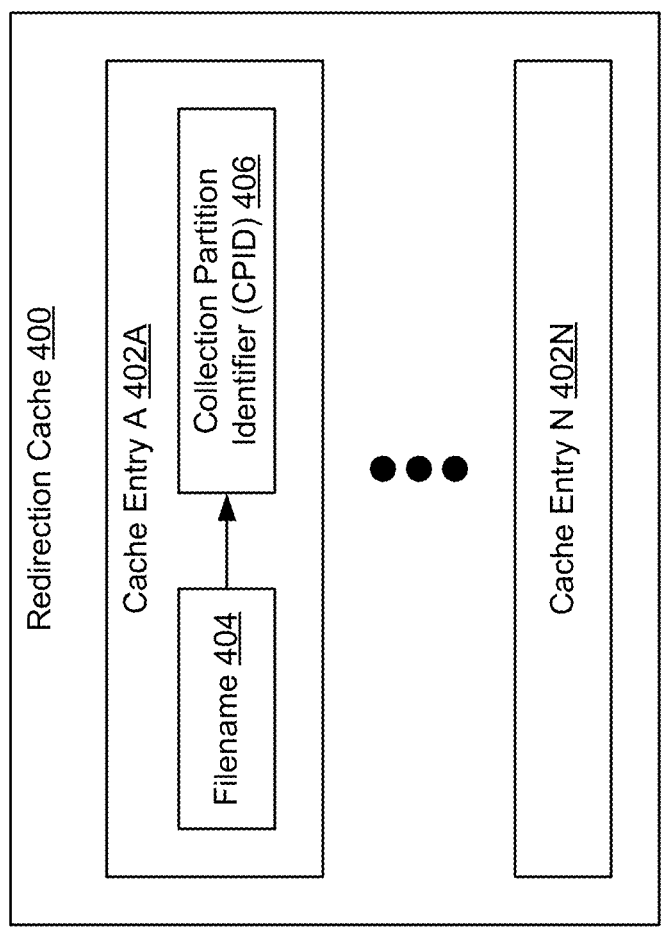
FIG. 4 shows a redirection cache in accordance with one or more embodiments of the invention.

FIG. 4 shows a redirection cache in accordance with one or more embodiments of the invention. The redirection cache (400) may represent a data structure for storing known file to collection partition mappings. The redirection cache (400) may track these mappings in the form of one or more cache entries (402A-402N). Further, each cache entry (402A-402N) may include a filename (404) and a collection partition identifier (CPID) (406). The filename (404) may refer to an arbitrary-length character string, associated with a given file, which may be used to uniquely identify the given file. The CPID (406), on the other hand, may represent another arbitrary-length character string, associated with a collection partition (CP) (see e.g., FIG. 2), which may be used to uniquely identify the CP. Accordingly, the redirection cache (400) may track which files may be consolidated in which CPs.

FIGS. 5A-5E show flowcharts describing the processing of an example file operation in accordance with one or more embodiments of the invention. The following example file operation—i.e., a REMOVE file operation—is for explanatory purposes only and not intended to limit the scope of the invention. One of ordinary skill will appreciate that embodiments of the invention may implement other file operations—e.g., a CREATE file operation, a READ file operation, a MOVE file operation, a WRITE file operation, etc.—without departing from the scope of the invention.

Figure 5A:
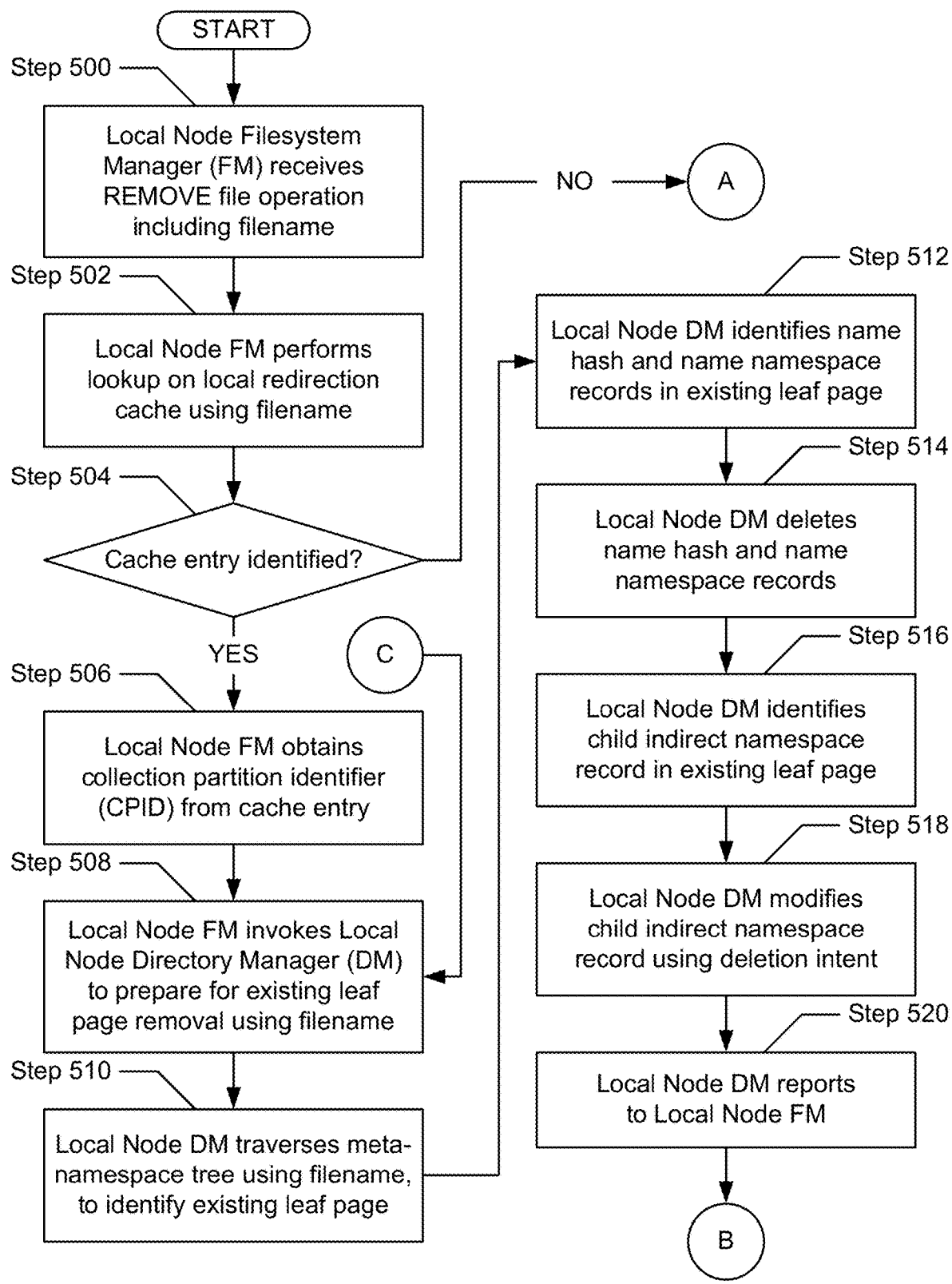
FIGS. 5A-5C show flowcharts describing a method for local node processing of a remove file operation in accordance with one or more embodiments of the invention.
Figure 5B:
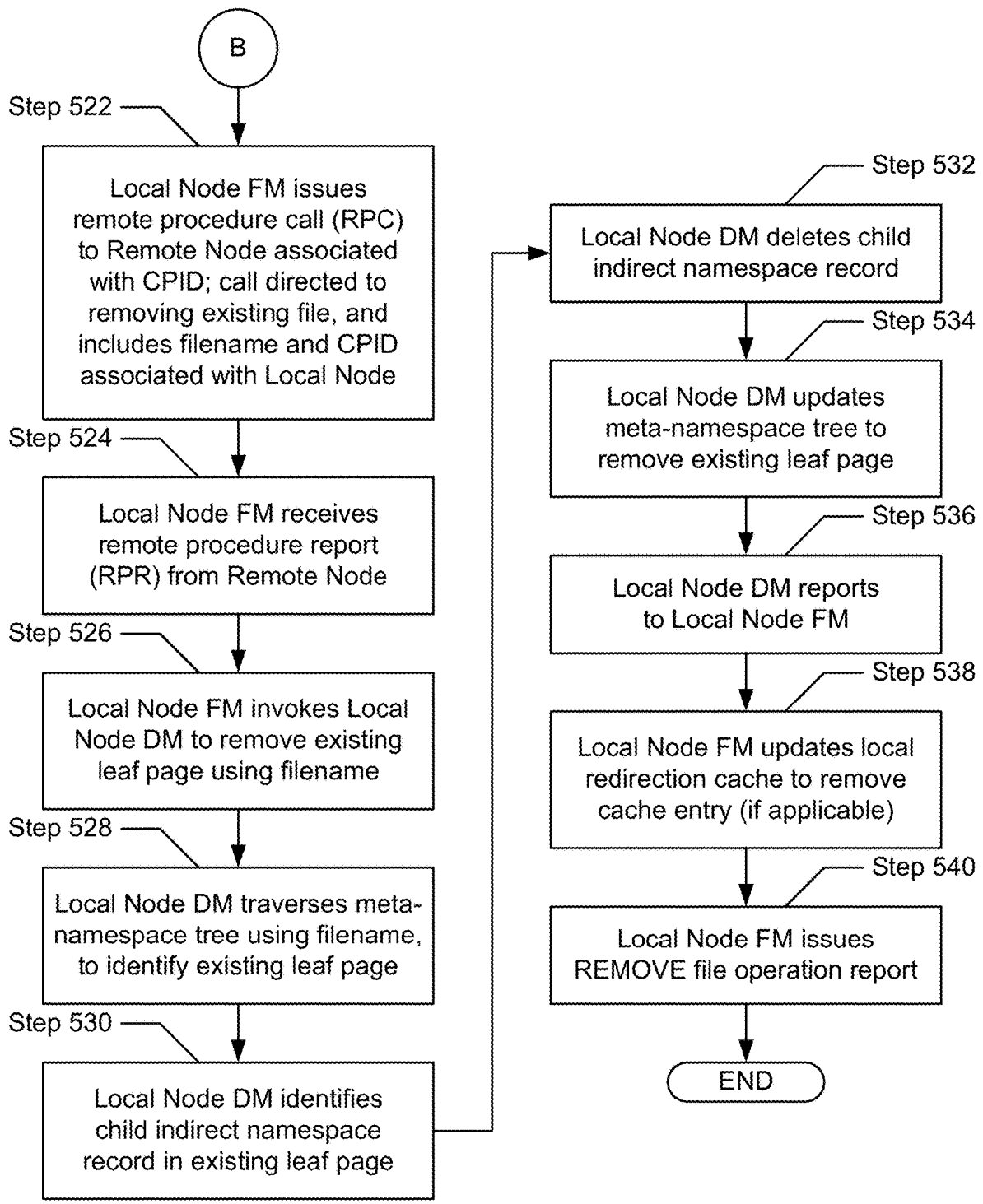
Figure 5C:
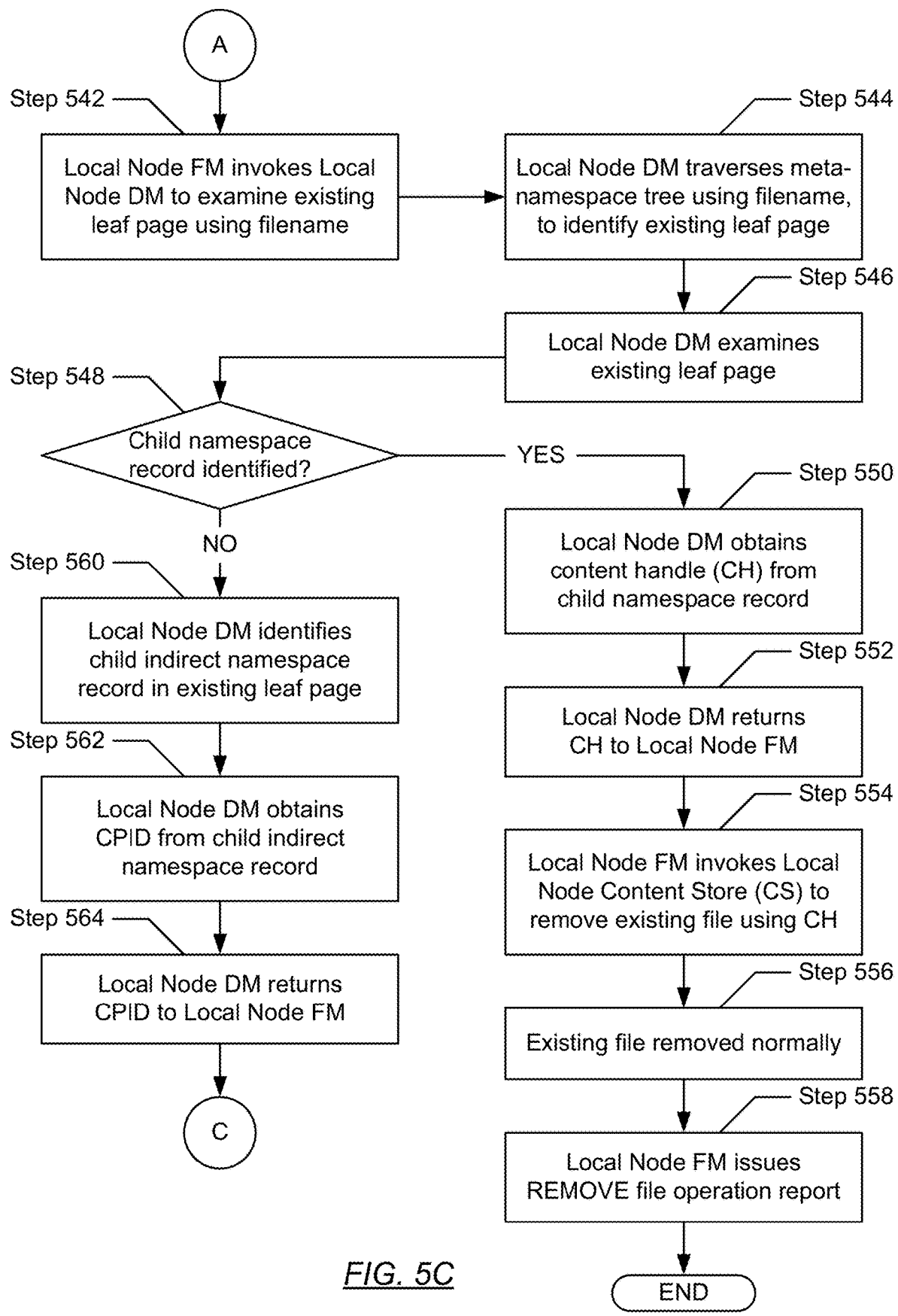

FIGS. 5A-5C show flowcharts describing a method for local node processing of a remove file operation in accordance with one or more embodiments of the invention. The various steps outlined below may be performed by a data deduplication service (DDS) of a local node (see e.g., FIG. 2). A local node may refer to a node of the distributed deduplication cluster (DDC) (see e.g., FIG. 1) selected to process a given file operation request submitted to the DDC. Further, while the various steps in the flowcharts are presented and described sequentially, one of ordinary skill will appreciate that some or all steps may be executed in different orders, may be combined or omitted, and some or all steps may be executed in parallel.

Turning to FIG. 5A, in Step 500, a local node filesystem manager (FM) receives a REMOVE file operation. In one embodiment of the invention, the REMOVE file operation may pertain to the removal of an existing file. Further, the REMOVE file operation may include a filename associated with the aforementioned existing file.

In Step 502, the local node FM performs a lookup on a local redirection cache (see e.g., FIG. 4) using the filename (received in Step 500). In one embodiment of the invention, the lookup may entail using the filename as a search key in attempting to identify a cache entry that includes the filename.

In Step 504, the local node FM makes a determination as to whether a cache entry has been identified based on the lookup (performed in Step 502). In one embodiment of the invention, if it is determined that the filename (received in Step 500) is included in an existing cache entry, then a cache entry has been identified and the process may proceed to Step 508. On the other hand, in another embodiment of the invention, if it is alternatively determined that the filename is included in none of the existing cache entries, then a cache entry has not been identified and the process may alternatively proceed to Step 522 (see e.g., FIG. 5B).

In Step 506, after determining (in Step 504) that a local redirection cache entry has been identified, the local node FM obtains a collection partition identifier (CPID) from the identified cache entry. In one embodiment of the invention, the CPID may be associated with a remote node—i.e., a remote node CPID. Further, the remote node CPID may refer to a unique identifier associated with a CP—i.e., a remote node CP—residing on the remote node.

In Step 508, the local node FM invokes a local node directory manager (DM). In one embodiment of the invention, invocation of the local node DM may be directed to preparing for a future removal of an existing leaf page (see e.g., FIG. 3B). Further, invocation of the local node DM may entail the filename (received in Step 500).

In Step 510, in response to being invoked, the local node DM traverses a meta-namespace tree (see e.g., FIG. 3A) using at least the filename as the traversal key. In one embodiment of the invention, traversal of the meta-namespace tree may employ any existing algorithm optimized for performing a search on a balanced B+ tree. Further, in traversing the meta-namespace tree, the local node DM identifies an existing leaf page associated with the filename.

In Step 512, the local node DM subsequently identifies a name hash namespace record and a name namespace record (see e.g., FIG. 3B) specified in the existing leaf page (identified in Step 510). Thereafter, the local node DM deletes the name hash namespace and name namespace records (identified in Step 512) from the existing leaf page.

In Step 514, the local node DM then identifies a child indirect namespace record (see e.g., FIG. 3B) specified in the existing leaf page. Subsequently, in Step 516, the local node DM modifies the child indirect namespace record (identified in Step 514) by replacing the existing namespace record value with a deletion intent. After modifying the child indirect namespace record, the local node DM reports to the local node FM.

Turning to FIG. 5B, in Step 522, the local node FM issues a remote procedure call (RPC) to a remote node associated with the remote node CPID (obtained in Step 506). In one embodiment of the invention, the RPC may be directed to the removal of an existing file. Further, the RPC may include the filename (received in Step 500) and a CPID associated with the local node—i.e., a local node CPID.

In Step 524, following the issuance of the RPC, the local node FM receives a remote procedure report (RPR) from the remote node. In one embodiment of the invention, the RPR may indicate that the file, associated with the filename, has been successfully removed from the collection partition (CP) residing on the remote node.

In Step 526, the local node FM invokes the local node DM. In one embodiment of the invention, invocation of the local node DM may be directed to the removal of an existing leaf page. Further, the invocation may entail the filename (received in Step 500).

In Step 528, in response to being invoked, the local node DM traverses a meta-namespace tree (see e.g., FIG. 3A) using at least the filename as the traversal key. In one embodiment of the invention, traversal of the meta-namespace tree may employ any existing algorithm optimized for performing a search on a balanced B+ tree. Further, in traversing the meta-namespace tree, the local node DM identifies an existing leaf page associated with the filename.

In Step 530, the local node DM then identifies a child indirect namespace record (see e.g., FIG. 3B) specified in the existing leaf page (identified in Step 528). Subsequently, in Step 532, the local node DM deletes the child indirect namespace record (identified in Step 530). Thereafter, in Step 534, the local node DM updates the meta-namespace tree (traversed in Step 528) by removing the existing leaf page (identified in Step 526) therefrom.

In Step 536, the local node DM reports to the local node FM. In one embodiment of the invention, the local node DM may report that the removal of the existing leaf page, per the invocation (performed in Step 526), had been successful. In Step 538, the local node FM updates the local redirection cache (see e.g., FIG. 4A). Specifically, in one embodiment of the invention, the local redirection cache may be updated to remove the cache entry (identified in Step 504). Thereafter, in Step 540, the local node FM issues a REMOVE file operation report to a cluster workload balancer (CWB) (see e.g., FIG. 1), which may relay the report to the host that had submitted a file operation request corresponding to the REMOVE file operation request (received in Step 500). Further, the report may indicate that the removal of the desired existing file was successful.

Turning to FIG. 5C, in Step 542, after determining (in Step 504) that a local redirection cache entry had not been identified, the local node FM invokes the local node DM. In one embodiment of the invention, invocation of the local node DM may be directed to the examination of an existing leaf page. Further, the invocation may entail the filename (received in Step 500).

In Step 544, in response to being invoked, the local node DM traverses a meta-namespace tree (see e.g., FIG. 3A) using at least the filename as the traversal key. In one embodiment of the invention, traversal of the meta-namespace tree may employ any existing algorithm optimized for performing a search on a balanced B+ tree. Further, in traversing the meta-namespace tree, the local node DM identifies an existing leaf page associated with the filename.

In Step 546, the local node DM examines the existing leaf page (identified in Step 544). Afterwards, in Step 548, the local node DM makes a determination as to whether a child namespace record (see e.g., FIG. 3B) is specified in the existing leaf page. In one embodiment of the invention, if it is determined that the existing leaf page includes a child namespace record, then the process may proceed to Step 550. On the other hand, in another embodiment of the invention, if it is alternatively determined that the existing leaf page excludes a child namespace record, then the process may alternatively proceed to Step 560.

In Step 550, after determining (in Step 548) that the existing leaf page includes a child namespace record, the local node DM obtains a content handle (CH) from the child namespace record. Subsequently, in Step 552, the local node DM returns the CH (obtained in Step 550) to the local node FM.

In Step 554, the local node FM invokes a local node content store (CS) (see e.g., FIG. 2). In one embodiment of the invention, invocation of the local node CS may be directed to the removal of file data for an existing file stored in the collection partition (CP) residing on the local node.

In Step 556, the aforementioned existing file is removed from consolidation on the local node. Removal of the file data associated with the existing file may be performed in any existing conventional manner. Afterwards, in Step 558, the local node FM issues a REMOVE file operation report to a cluster workload balancer (CWB) (see e.g., FIG. 1), which may relay the report to the host that had submitted a file operation request corresponding to the REMOVE file operation request (received in Step 500). Further, the report may indicate that the removal of the desired existing file was successful.

In Step 560, after determining (in Step 548) that the existing leaf page (identified in Step 544) excludes a child namespace record, the local node DM identifies a child indirect namespace record in the existing leaf page. Then, in Step 562, the local node DM obtains a CPID associated with a remote node—i.e., a remote node CPID—from the child indirect namespace record. Subsequently, the local node DM returns the remote node CPID to the local node FM; and the process proceeds to Step 508.

Figure 5D:
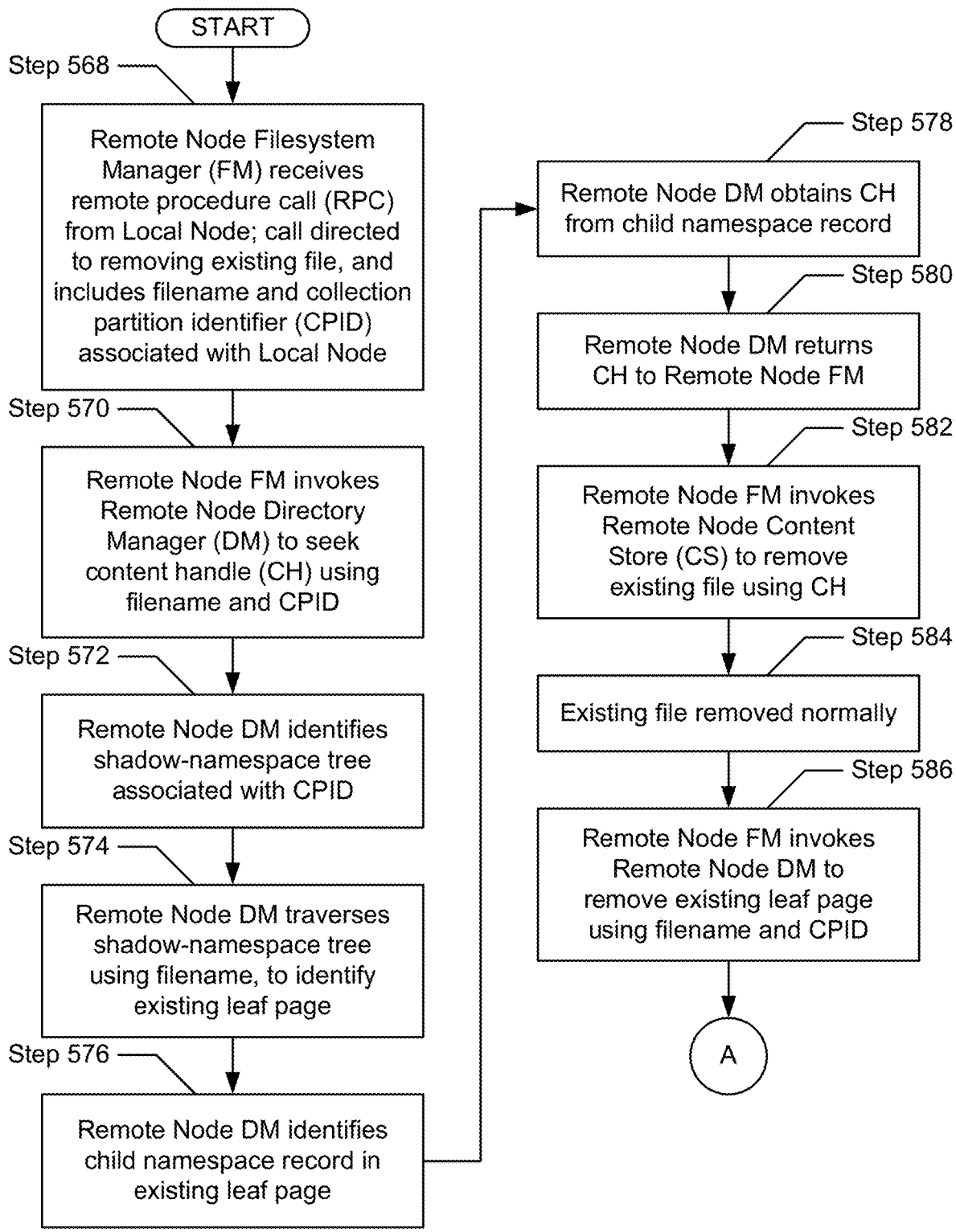
FIGS. 5D and 5E shows a flowchart describing a method for remote node processing of a read directed remote procedure call in accordance with one or more embodiments of the invention.
Figure 5E:
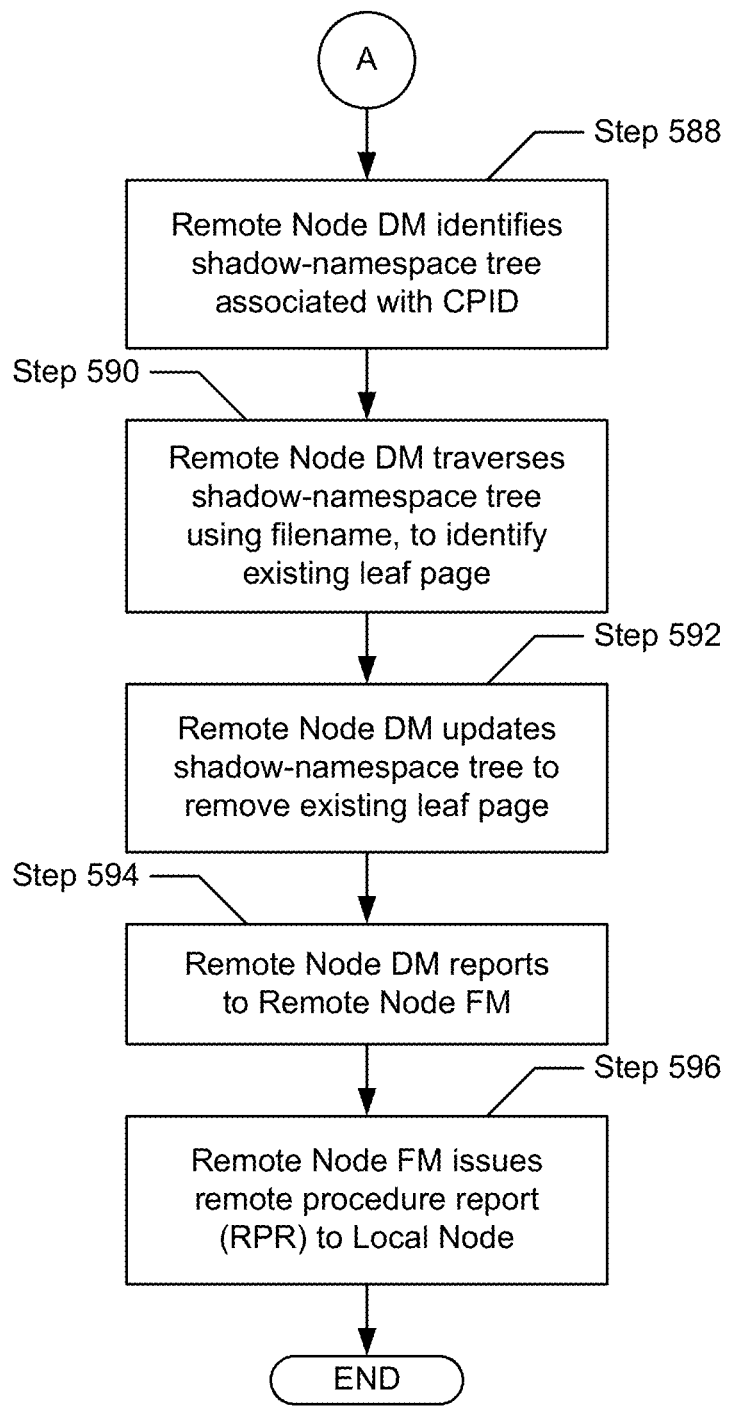

FIGS. 5D and 5E show flowcharts describing a method for remote node processing of a remote directed remote procedure call (RPC) in accordance with one or more embodiments of the invention. The various steps outlined below may be performed by a data deduplication service (DDS) of a remote node (see e.g., FIG. 2). A remote node may refer to a node of the distributed deduplication cluster (DDC) (see e.g., FIG. 1) not selected to process a given file operation request submitted to the DDC. Further, while the various steps in the flowcharts are presented and described sequentially, one of ordinary skill will appreciate that some or all steps may be executed in different orders, may be combined or omitted, and some or all steps may be executed in parallel.

Turning to FIG. 5D, in Step 568, a remote node filesystem manager (FM) receivers a remote procedure call (RPC) from a local node. In one embodiment of the invention, the RPC may be directed to the removal of file data for an existing file stored in a collection partition (CP) residing on the remote node. Further, the RPC may include a filename associated with the aforementioned existing file, and a collection point identifier (CPID) associated with the local node—i.e., a local node CPID.

In Step 570, the remote node FM invokes a remote node directory manager (DM). In one embodiment of the invention, invocation of the remote node DM may be directed to seeking a content handle (CH) for the existing file. Further, the invocation may entail the filename and the local node CPID (received in Step 568).

In Step 572, in response to being invoked, the remote node DM identifies a shadow-namespace tree associated with local node CPID. In Step 574, the remote node DM subsequently traverses the shadow-namespace tree (identified in Step 572) using at least the filename as the traversal key. In one embodiment of the invention, traversal of the shadow-namespace tree may employ any existing algorithm optimized for performing a search on a balanced B+ tree. Further, in traversing the shadow-namespace tree, the remote node DM identifies an existing leaf page associated with the filename.

In Step 576, the remote node DM examines the existing leaf page to identify a child namespace record (see e.g., FIG. 3B) therein. In Step 578, the remote node DM obtains the CH, sought by the invocation, from the child namespace record. Thereafter, in Step 580, the remote node DM returns the CH (obtained in Step 578) to the remote node FM.

In Step 582, the remote node FM invokes a remote node content store (CS) (see e.g., FIG. 2). In one embodiment of the invention, invocation of the remote node CS may be directed to removing file data for an existing file. Further, the invocation may entail the CH (returned in Step 580).

In Step 584, the aforementioned existing file is removed from consolidation on the remote node. Removal of the file data associated with the existing file may be performed in any existing conventional manner. Thereafter, in Step 586, the remote node FM invokes the remote node DM. In one embodiment of the invention, invocation of the remote node DM may be directed to removing an existing leaf page. Further, the invocation may entail the filename and the local node CPID (received in Step 568).

Turning to FIG. 5E, in Step 588, the remote node DM identifies a shadow-namespace tree associated with local node CPID. In Step 590, the remote node DM subsequently traverses the shadow-namespace tree (identified in Step 588) using at least the filename as the traversal key. In one embodiment of the invention, traversal of the shadow-namespace tree may employ any existing algorithm optimized for performing a search on a balanced B+ tree. Further, in traversing the shadow-namespace tree, the remote node DM identifies an existing leaf page associated with the filename.

In Step 592, the remote node DM updates the shadow-namespace tree (traversed in Step 590) by removing the existing leaf page therefrom. In Step 594, the remote node DM reports to the remote node FM. In one embodiment of the invention, the remote node DM may report that the removal of the existing leaf page, per the invocation (performed in Step 586), had been successful. In Step 596, the remote node FM issues a remote procedure report (RPR) to the local node. The RPR may indicate the successful removal of file data for an existing file that had been stored in a CP residing on the remote node.

Figure 6:
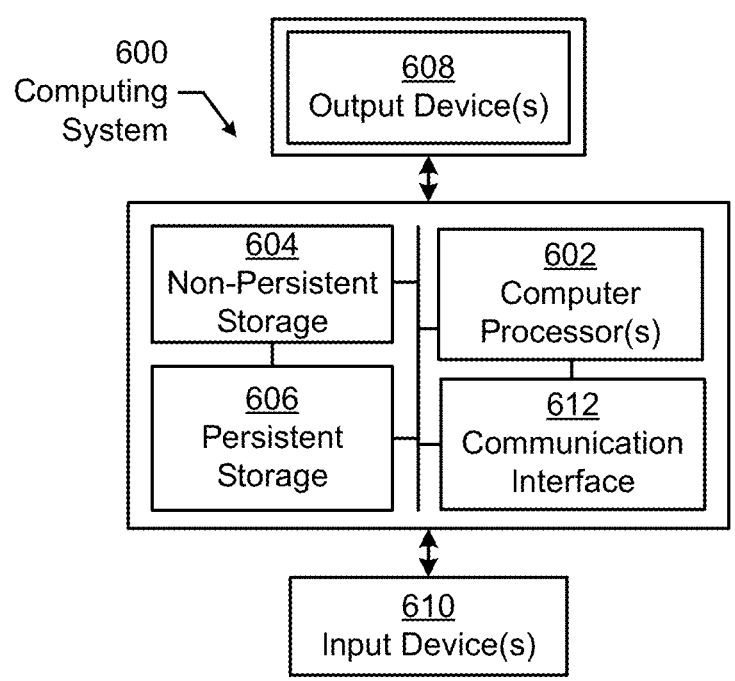
FIG. 6 shows a computing system in accordance with one or more embodiments of the invention.

FIG. 6 shows a computing system in accordance with one or more embodiments of the invention. The computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (610), output devices (608), and numerous other elements (not shown) and functionalities. Each of these components is described below.

In one embodiment of the invention, the computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device. Further, the communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

In one embodiment of the invention, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
a plurality of data deduplication services (DDS) comprising a first DDS operatively connected to a second DDS, wherein the first DDS is programmed to:
receive a file operation comprising a filename associated with a file;
perform a lookup on a local redirection cache using the filename;
make a first determination, based on the lookup, that the local redirection cache excludes the filename;
traverse, based on the first determination, a meta-namespace tree using the filename, to identify a leaf page;
make a second determination, based on examining the leaf page, that the leaf page excludes a child namespace record;
identify, based on the second determination, a child indirect namespace record in the leaf page instead;
obtain a first collection partition identifier (CPID) from the child indirect namespace record; and
issue a remote procedure call (RPC) comprising the filename and a second CPID, to the second DDS, wherein the second DDS is associated with the first CPID.

2. The system of claim 1, further comprising:
a first collection partition (CP) formed from a first physical storage array (PSA),
wherein the second CPID identifies the first CP.

3. The system of claim 2, further comprising:
a first node comprising the first DDS operatively connected to the first PSA.

4. The system of claim 3, further comprising:
a second node operatively connected to the first node,
wherein the second node comprises the second DDS.

5. The system of claim 4, wherein the second node further comprises a second PSA operatively connected to the second DDS.

6. The system of claim 5, wherein the second node further comprises a second CP formed from the second PSA, wherein the first CPID identifies the second CP.

7. The system of claim 4, further comprising:
a cluster workload balancer (CWB) operatively connected to a plurality of nodes comprising the first node and the second node,
wherein the CWB delegates the file operation to the first DDS.

8. The system of claim 7, wherein the CWB comprises a global namespace (GNS), wherein the GNS presents a virtualized filesystem comprising the meta-namespace tree and a second meta-namespace tree.

9. The system of claim 7, further comprising:
a host; and
a distributed deduplication cluster (DDC) operatively connected to the host,
wherein the DDC comprises the CWB and the plurality of nodes.

10. A method for processing file operations, comprising:
receiving a first file operation comprising a first filename associated with a first file;
performing a first lookup on a local redirection cache using the first filename;
making a first determination, based on the first lookup, that the local redirection cache excludes the first filename;
traversing, based on the first determination, a meta-namespace tree using the first filename, to identify a first leaf page;
making a second determination, based on examining the first leaf page, that the first leaf page excludes a child namespace record;
identifying, based on the second determination, a child indirect namespace record in the first leaf page instead;
obtaining a first collection partition identifier (CPID) from the child indirect namespace record; and
issuing a first remote procedure call (RPC) comprising the first filename and a second CPID, to a first remote node associated with the first CPID,
wherein the first remote node processes the first RPC to execute the first file operation.

11. The method of claim 10, further comprising:
receiving, from the first remote node, a first remote procedure report (RPR) comprising first file operation results; and
issuing a first file operation report comprising the first file operation results.

12. The method of claim 11, wherein processing of the first RPC, by the first remote node, comprises:

identifying a shadow-namespace tree associated with the second CPID;
traversing the shadow-namespace tree using the first filename, to identify a second leaf page;
examining the second leaf page, to identify a first child namespace record;
obtaining a first content handle (CH) from the first child namespace record;
accessing the first file using the first CH;
performing the first file operation on the first file, to obtain first file operation results; and
issuing the first RPR comprising the first file operation results.

13. The method of claim 10, further comprising:
receiving a second file operation comprising a second filename associated with a second file;
performing a second lookup on the local redirection cache using the second filename;
making a third determination, based on the second lookup, that a local redirection cache entry comprises the second filename;
obtaining, based on the third determination, a third CPID from the local redirection cache entry; and
issuing a second RPC comprising the second filename and the second CPID, to a second remote node associated with the third CPID,
wherein the second remote node processes the second RPC to execute the second file operation.

14. The method of claim 10, further comprising:
receiving a second file operation comprising a second filename associated with a second file;
performing a second lookup on the local redirection cache using the second filename;
making a third determination, based on the second lookup, that the local redirection cache excludes the second filename;
traversing, based on the third determination, the meta-namespace tree using the second filename, to identify a second leaf page;
making a fourth determination, based on examining the second leaf page, that the second leaf page comprises a first child namespace record;
obtaining a content handle (CH) from the first child namespace record;
accessing the second file using the CH;
performing the second file operation on the second file, to obtain second file operation results; and
issuing a second file operation report comprising the second file operation results.

15. The method of claim 10, wherein the file operation is one selected from a group consisting of a READ file operation and a WRITE file operation.

16. A non-transitory computer readable medium (CRM) comprising computer readable program code, which when executed by a computer processor, enables the computer processor to:
receive a first file operation comprising a first filename associated with a first file;
perform a first lookup on a local redirection cache using the first filename;
make a first determination, based on the first lookup, that the local redirection cache excludes the first filename;
traverse, based on the first determination, a meta-namespace tree using the first filename, to identify a first leaf page;
make a second determination, based on examining the first leaf page, that the first leaf page excludes a child namespace record;
identify, based on the second determination, a child indirect namespace record in the first leaf page instead;
obtain a first collection partition identifier (CPID) from the child indirect namespace record; and
issue a first remote procedure call (RPC) comprising the first filename and a second CPID, to a first remote node associated with the first CPID,
wherein the first remote node processes the first RPC to execute the first file operation.

17. The non-transitory CRM of claim 16, further comprising computer readable program code, which when executed by the computer processor, enables the computer processor to:
receive, from the first remote node, a first remote procedure report (RPR) comprising first file operation results; and
issue a first file operation report comprising the first file operation results.

18. The non-transitory CRM of claim 16, wherein processing of the first RPC, by the first remote node, comprises:
identifying a shadow-namespace tree associated with the second CPID;
traversing the shadow-namespace tree using the first filename, to identify a second leaf page;
examining the second leaf page, to identify a first child namespace record;
obtaining a first content handle (CH) from the first child namespace record;
accessing the first file using the first CH;
performing the first file operation on the first file, to obtain first file operation results; and
issuing the first RPR comprising the first file operation results.

19. The non-transitory CRM of claim 16, further comprising computer readable program code, which when executed by the computer processor, enables the computer processor to:
receive a second file operation comprising a second filename associated with a second file;
perform a second lookup on the local redirection cache using the second filename;
make a third determination, based on the second lookup, that a local redirection cache entry comprises the second filename;
obtain, based on the third determination, a third CPID from the local redirection cache entry; and
issue a second RPC comprising the second filename and the second CPID, to a second remote node associated with the third CPID,
wherein the second remote node processes the second RPC to execute the second file operation.

20. The non-transitory CRM of claim 16, further comprising computer readable program code, which when executed by the computer processor, enables the computer processor to:
receive a second file operation comprising a second filename associated with a second file;
perform a second lookup on the local redirection cache using the second filename;
make a third determination, based on the second lookup, that the local redirection cache excludes the second filename;

traverse, based on the third determination, the meta-namespace tree using the second filename, to identify a second leaf page;
make a fourth determination, based on examining the second leaf page, that the second leaf page comprises a first child namespace record;
obtain a content handle (CH) from the first child namespace record;
access the second file using the CH;
perform the second file operation on the second file, to obtain second file operation results; and
issue a second file operation report comprising the second file operation results.

\* \* \* \* \*